(12) United States Patent
Ordonez et al.

(10) Patent No.: US 7,727,330 B2
(45) Date of Patent: Jun. 1, 2010

(54) UNIVERSAL HYDRAULIC BINDER BASED ON FLY ASH TYPE F

(75) Inventors: Luis Miguel Ordonez, Ipsach (CH); Thierry Sperisen, Berne (CH); Javier Vazquez-Favela, Port (CH); Hugo Bolio-Arceo, San Pedro Garza Garcia (MX)

(73) Assignee: CEMEX Research Group AG, Brugg Bei Biel (CH)

( * ) Notice: Subject to any disclaimer, the term of this patent is extended or adjusted under 35 U.S.C. 154(b) by 0 days.

(21) Appl. No.: 12/280,517

(22) PCT Filed: Feb. 24, 2006

(86) PCT No.: PCT/IB2006/000388

§ 371 (c)(1),
(2), (4) Date: Apr. 8, 2009

(87) PCT Pub. No.: WO2007/096686

PCT Pub. Date: Aug. 30, 2007

(65) Prior Publication Data

US 2009/0217844 A1 Sep. 3, 2009

(51) Int. Cl.
C04B 7/153 (2006.01)
C04B 7/24 (2006.01)
C04B 28/08 (2006.01)

(52) U.S. Cl. .................. 106/707; 106/624; 106/789; 106/DIG. 1

(58) Field of Classification Search .......... 106/624, 106/707, 789, DIG. 1
See application file for complete search history.

(56) References Cited

U.S. PATENT DOCUMENTS

| 5,084,102 | A | * | 1/1992 | Brouns et al. ............. 106/707 |
| 5,342,445 | A | * | 8/1994 | Kiyomoto et al. .......... 106/789 |
| 5,435,843 | A | | 7/1995 | Roy et al. |
| 5,482,549 | A | | 1/1996 | Blaakmeer et al. |
| 5,565,028 | A | | 10/1996 | Roy et al. |
| 5,601,643 | A | | 2/1997 | Silverstrim et al. |
| 5,624,489 | A | * | 4/1997 | Fu et al. .................... 106/692 |
| 5,755,876 | A | * | 5/1998 | Stokes et al. .............. 106/739 |
| 5,810,922 | A | * | 9/1998 | Okamoto et al. .......... 106/714 |
| 6,572,698 | B1 | | 6/2003 | Ko |
| 2008/0271641 | A1 | * | 11/2008 | Ko et al. .................... 106/405 |
| 2008/0289542 | A1 | * | 11/2008 | Ko et al. .................... 106/695 |

FOREIGN PATENT DOCUMENTS

| EP | 1091913 B1 | 9/2002 |
| EP | 0858978 B1 | 1/2005 |
| WO | WO9831644 A1 | 2/1998 |
| WO | WO0000447 A1 | 6/1999 |
| WO | WO 02/090292 A2 * | 11/2002 |
| WO | WO2005097700 A2 | 10/2005 |
| WO | WO2007096686 A1 | 2/2006 |
| WO | WO 2006/126752 A1 * | 11/2006 |

OTHER PUBLICATIONS

Derwent-Acc-No. 2008E72818, abstract of Chinese Patent Specification No. CN101100854A (Jan. 2008).*
International Search Report for PCT/IB2006/000388, [Nov. 2006].
Database Compendex [Online] Engineering Information, Inc., New York, NY, US; 1999, Skvara Frantisek et al: "Chemical Activation of Substances with latent hydraulic properties" XP002404439 Database accession No. E2000034932002 abstract; -& Ceram Silikaty; Ceramics—Silikaty 1999 Inst Chem Technol, Prague, Czech Republic; vol. 43, No. 3, 1999, pp. 111-116, XP008070553.
Chemical Abstsracts, vol. 101, No. 18, Oct. 29, 1984, Columbus, Ohio, US: abstract No. 156485b, Krystyna G. et al: "Slay-fly ash binders" p. 274 XP000184522 abstract & CEM-WAPNO-GIPS, No. 4, 1984, pp. 104-110, ISSN: 0009-2258.

* cited by examiner

*Primary Examiner*—Anthony J Green
(74) *Attorney, Agent, or Firm*—BlankRome LLP

(57) ABSTRACT

The present invention concerns the development of a simple, multipurpose, low cost, environmental friendly and safe binder formulation and related process, based on high volumes of alkaline activated class F fly ash residue (>760%) without ordinary Portland cement and related products, offering a wide scope of applications. More specifically, the universal binder is based on a very limited number of components (fly ash type F, Blast Furnace Slag and a mixture of alkali silicates and carbonates). The binder allows developing considerable strength at the early stage (at room temperature) and very high resistances at 28 days. The binder applies to pastes, mortars concretes and pre-cast with the same flexibility of an Ordinary Portland Cement.

14 Claims, 2 Drawing Sheets

TAB. 1.

|     | SiO$_2$ | Al$_2$O$_3$ | CaO | Fe$_2$O$_3$ | K$_2$O | Na$_2$O | MgO | SO$_3$ | Mn$_2$O$_3$ | TiO$_2$ | P$_2$O$_5$ | LOI |
|-----|---------|-------------|-----|-------------|--------|---------|-----|--------|-------------|---------|------------|-----|
| FA  | 41.69   | 25.70       | 6.15| 19.93       | 1.24   | 0.00    | 1.13| 0.37   | 0.10        | 1.13    | 0.36       | 0.66|
| BFS | 34.41   | 12.26       | 41.16| 0.31       | 0.31   | 0.10    | 5.98| 2.58   | 0.39        | 1.35    | 0.00       | 0.00|

TAB. 2

|     | Bulk density (Kg/m3) | density (Kg/m3) | Fineness (volume, %) | | | Color | | |
|-----|----------------------|-----------------|----------------------|---|---|-------|---|---|
|     |                      |                 | <3 μm | 3-32 μm | >32 μm | L* | a* | b* |
| FA  | 1.15                 | 2.53            | 6.05  | 42.33   | 51.62  | 50.22 | 1.81 | 12.65 |
| BFS | 0.87                 | 2.96            | 10.88 | 78.46   | 10.65  | 84.6  | 0.2  | 3.58  |

TAB. 3

| Example | FAF(%) | GGBFS(%) | w/b | Activators (%) | | | | Compressive strength (MPa) | | |
|---------|--------|----------|-----|----------------|---|---|---|----------------------------|---|---|
|         |        |          |     | R$_2$O (n)SiO$_2$ | | R$_2$CO$_3$ | | 2 days | 7 days | 28 days |
|         |        |          |     | Na | K | Na | K |        |        |         |
| 1 | 63.0 | 27.0 | 0.37 | 1.4 |     | 8.6 |     | 13.2 | 46.1 | 65.4 |
| 2 | 62.7 | 26.8 | 0.37 | 2.7 |     | 7.8 |     | 27.0 | 57.0 | 76.6 |
| 3 | 63.8 | 27.3 | 0.37 |     | 0.9 | 4.5 | 3.6 | 22.7 | 48.0 | 62.6 |
| 4 | 72.4 | 18.1 | 0.34 |     | 1.8 | 4.3 | 3.4 | 15.2 | 40.1 | 57.3 |
| 5 | 80.5 | 8.9  | 0.31 |     | 1.8 |     | 8.8 | 11.7 | 31.4 | 53.7 |

UNIVERSAL HYDRAULIC BINDER BASED ON FLY ASH TYPE F

The present invention concerns a simple, multipurpose, low cost, environmental friendly and safe binder containing a high content of alkaline activated class F fly ash (>60% by weight) without ordinary Portland cement. The invention also concerns related process and related product, offering a wide scope of applications.

BACKGROUND OF THE INVENTION

Fly ash is a by-product of burning coal, typically generated during the production of electricity at coal-fired power plants. Fly ashes are mainly composed by aluminosilicates partially vitrified, as well as mineral phases such as quartz, hematite, maghemite, anhydrite and so on which had been present as impurities in the original coal.

ASTM C 618-85 ("Standard specification for fly ash and raw calcinated natural pozzolan for use as a mineral admixture in Portland cement concrete") has classified fly ash into two classes, Class C and Class F, depending on the total sum of silica, alumina and ferric oxide present. Class F contains more than 70% of the above oxides and Class C contains less than 70% but more than 50%. Class F fly ash is typically low in calcium oxide (<8%) whereas Class C has a higher content being sub-classified in two categories: Class CI (8-20% CaO) and Class CH (>20% CaO). Therefore, Class F fly ash is not usually considered as a cementitious material by itself because, due to its low calcium oxide content, it cannot be agglomerated after hydration to produce bonding strength in the final product, contrary to Class C fly ash.

Fly ash is a by-product that has to be used and consumed to reduce its environmental impact. Nowadays, it has mainly been used as a partial substitute in Ordinary Portland Cement due to its pozzolanic reactivity. However, there is a limitation in the replaced quantity because the pozzolanic reaction rate is very low at room temperature causing initial low strength and fast neutralization.

Recently trials have been carried out to increase the pozzolanic reaction rate by using activators such as alkaline and alkaline earth compounds (ROH, R(OH)$_2$), salts from weak acids (R$_2$CO$_3$, R$_2$S, RF) and silicic salts type R$_2$O(n)SiO$_2$, where R is an alkaline ion from Na, K or Li. However, either the activation efficiency is not enough or there are some undesired interactions between ordinary Portland cement and activators, which causes rheological and/or mechanical problems. This fact promotes the use of additional components, mainly admixtures, which increases the complexity of the formulation and makes worse the technological development of these products.

The high amount of lime CaO in fly ash type C provides the waste product with intrinsic cementitious properties. On the other hand fly ash type F does not by itself develop any strength on hydration, and an activation of the product is requested to ensure that strength development will take place on hydration. A major advantage to prefer fly ash type F rather than fly ash type C is the high availability in large quantities of fly ash type F and its lower market price. Since transportation costs of industrial wastes would be a key issue for the cost effectiveness of the final product or binder, the selection of fly ash type F is guided by its availability in large quantities and its dense geographic distribution.

For many years, many formulations and processes have been proposed to activate fly ash or industrial wastes in order to use it as a cementitious material.

U.S. Pat. Nos. 5,435,843 and 5,565,028 described the activation of Class C fly ash at room temperature with strong alkali (pH>14.69) to yield cementitious properties. Even though there is no express mention of Class F fly ash use in these patents, the cement containing Class C fly ash according to these patents has limited application due to the corrosive properties (pH>14.6) of the used activators.

Patent EP0858978 discloses that high volumes of activated Class C Fly ash (>90%) may be used as a cementitious binder. The binder contains a mix of Class C and Class F Fly ashes wherein the dosage of Class F fly ash has to be limited up to 60% due to its low reactivity. In this case, Class F Fly ash is mentioned but it is used together with clinker and admixtures like citric acid, borax, Boric acid, which are very expensive, and KOH, which is corrosive (pH>13). Furthermore, formulations get complex because the high number (>6) of presented components.

In a similar way, U.S. Pat. No. 5,482,549 describes a cement mixture containing at least 2% by weight of Portland cement clinker, 2-12% by weight of sodium silicate, fly ash and blast furnace slag. The patent specifies that the fly ash has to be ground to a specific surface of more than 500 square meters per kg which is very important and yields high manufacturing costs (energy consumption, handling, etc.). Furthermore, this document doesn't mention the use of Class F fly ash.

Xu et al. "The activation of Class C-, Class F-Fly Ash and Blast Furnace Slag Using Geopolymerisation", 8th CAN-MET/ACI International Conference on Fly Ash, Silica Fume, Slag and natural Pozzolans in Concrete, Las Vegas, Calif., USA (2004), shows that Class F fly ash can only be properly activated when using a highly alkaline soluble silicate solution. Following this line, patent U.S. Pat. No. 5,601,643 proposes an invention related with chemically-activated fly ash cementitious materials, preferably Class F Fly ash, where high content of alkali metal and/or alkaline earth metal silicate are used to obtain high strength cementitious mixtures. However, this invention has a limited application because: 1) a high curing temperature is need, 2) a high pH (>14, corrosive products) is required and therefore, safety conditions are necessary to handle the mixture and 3) the cost of the mixture is high due to the high quantities of soluble silicates and alkalis used. Furthermore, this patent proposes to use activator like alkali hydroxides, which cannot be employed in a solid state because of theirs affinity to moisture, carbonation and huge heat released during dissolution. Therefore, the cementitious material according to this invention can't be transport in a powder form. Furthermore, formulations related with high alkalis content and high pH cause alkali-leaching problems and efflorescence due to the overdose of activators. The overdose of activators is due to Class F fly ash that is considered as a binder and not as active filler, which requires less alkaline dosage for being activated.

U.S. Pat. Nos. 6,572,698 and EP1091913 are related to an activated supersulphated aluminosilicate binder containing aluminosilicates, calcium sulphate and activator, which contains alkali metal salts. Fly ash is mentioned as aluminosilicate, but it is not specified the Class of fly ash used. Binders with more than 90% of fly ash were activated at room temperature using cement kiln dust (CKD) and admixtures such as plasticizers and accelerators. Shah et Wang. "Development of "Green cement" for sustainable concrete using Cement Kiln Dust (CKD) and Fly Ash", International Workshop on Sustainable Development and Concrete Technology, (Beijing, China, May 20-21, 2004), shows that Class F fly ash activated with CKD at room temperature provides binders with low initial and final mechanical strength. Therefore, fly ash from patents U.S. Pat. Nos. 6,572,698 and EP1091913 has to be either class C or a mix of the mentioned one and Class F. Thus, it is not possible to activate high volumes of Class F Fly ash with CKD. Furthermore, binders made from CKD are not totally environmentally friendly because CKD is a by-product from the cement industry. In addition, the binder formulations were complex due to a high number of components. Thus, these products are expensive and their technological development is worse.

An example of this fact is the binder proposed by these patents made of fly ash, blast furnace slag, anhydrite, CKD, accelerators and plasticizers. In this case, the proportion of the fly ash does not exceed 40%. Furthermore, CKD is a by-product from cement industry which quality, mainly measured from the quantity of alkalis, depends on the variations of raw materials from cement production.

Patent WO9831644 concerns a method to manufacture cheap geopolymeric cement using alkaline aluminosilicates from geologic origin. In this case, the hardener is made of blast furnace slag and metakaolin. However, although the inventor may achieve a cost reduction from activators, the binder has limited application because of the high cost of metakaolin which is a product coming from calcined kaolin, which is not a residue. Furthermore, metakaolin is a product with small density and high water demand because of its high specific surface. This fact may produce a higher water demand of the binder, which is counterproductive for the mechanical properties.

It can thus be seen that a formulation based on high volumes of alkaline activated class F fly ash residue (>60%), complying with industrial requirements, involving a limited number of components would be of considerable advantage for the construction industry to provide a multi-purpose binder compared to the disclosed solutions hereinabove.

The aim of the invention is to remedy to the above drawback by providing a binder, which have the following characteristic:
- environmental friendly
- easy to formulate involving limited number of components
- safe and easy to handle and to prepare with conventional equipment.
- multipurpose, versatility to be used in bags, in bulk, as a ready mix, for all type of mortars and concrete applications
- cost effectiveness
- ability to be stored over long period of time
- ability to be prepared on the construction site
- no specific curing conditions Typically, the invention doesn't aim to use any cement or cement related compounds (like cement kiln dusts for instance). The advantage not to use cement in the formulation of the binder is mainly based on the objective of simplicity and polyvalence of the invention. Cement or the like additions in the formulation will lead to additional problems of interactions with the chemical activators that need to circumvent by further specific chemicals etc, special curing conditions, high pH etc. The objective of early strength development, as well as the universal property of the binder will be very difficult to achieve. Finally, the ecological advantages of the product according to the invention will be reduced since cement, clinker or cement kiln dust additions are correlated to additional $CO_2$ emissions.

It will be seen in the following description that none of the prior art present the technical features and none of the prior art have all advantages provided by the present invention.

SUMMARY OF THE INVENTION

The described multipurpose binder refers to a cementitious material made from a simple formulation of maximum 4 components, without taking into account conventional admixtures used for Ordinary Portland Cement (e.g. superplasticizers), that is easy to produce at room temperature and to operate without special safety conditions (irritant activators with ph<13), following a robustness process, with similar or better properties (rheology, mechanical strength, durability etc.) than ordinary Portland cement (OPC), and covering a wide scope of applications in various fields, preferably for ready-mix mortars and concrete.

Therefore, the aim of the invention is to provide a low cost and simple multipurpose industrial binder made from activated residues: high volumes of Class F fly ash (>60%), small quantities of Blast Furnace Slag (<28%) and very small quantities of industrially available alkaline carbonate ($R_2CO_3$) and alkaline silicate $R_2O$ (n)$SiO_2$, where R is an alkaline ion from Na, K or Li.

A further aim of the invention is to provide an industrial cementitious binder that develops strength over time (e.g. after 2, 7 or 28 days) in a similar way that Ordinary Portland Cement at room temperature (EN 32.5, 42.5 and EN 52.5).

A further aim of the invention is to provide a binder, which fabrication costs are optimized, and complying with the industrial requirements of a standard cementitious binder.

An important advantage of the invention is that it provides a very robust product and process, which is not sensitive over chemical composition variations of the industrial wastes (fly ash type F and Blast Furnace Slag). Thus, the expected mechanical resistance requirements are always achieved.

An another advantage of the invention is that the manufacturing price of the binder and the production costs of mortars or concretes based on the binder are similar to those obtained with OPC.

Ecological advantages are present with this invention because it is a friendly cementitious binder made from residues, with limited indirect $CO_2$ emissions and with low energy consumption during its production. Furthermore, the alkali leachability is controlled by correct dosage of activators insuring their combination in the hydration products.

Safety advantages may also appear since the binder and the related process do not involve storage and manipulation of dangerous or aggressive components.

Furthermore, binder, according to the invention, must have an improved durability and an improved resistance to sulphate attack, freeze-thaw, seawater, and acids.

Other advantages will appear in the following detailed description, where the invention will be better understood based on exemplary embodiments and comparative examples by means of the following tables and figures.

BRIEF DESCRIPTION OF TABLES AND DRAWINGS

Table 1 shows typical chemical composition of respectively class F fly ash and blast furnace slag used to make the binder according to the present invention;

Table 2 shows some representative typical properties of respectively class F fly ash and blast furnace slag used to make the binder according to the present invention;

Table 3 shows some examples of the binder composition presented in this invention with the values of mechanical strength obtained after 2, 7 and 28 days at room temperature;

DETAILED DESCRIPTION

The binder according to the invention is manufactured from fly ash, blast furnace slag and chemical activators.

The dry hydraulic binder according to the invention comprises:
Fly ash containing less than 8% w/w of CaO: 60-85% by weight;- Blast furnace slag: 8-28% by weight; and
A chemical activator containing:
From 1 to 4 wt. % of alkaline silicates; and
From 7 to 11 wt. % of alkaline carbonates.

Advantageously, the fly ash is pure class F fly ash.

Fly ash is the main component of the binder. Fly ashes are mainly composed by aluminosilicates partially vitrified, as well as mineral phases such as quartz, hematite, magnetite, anhydrite and so on which had been present as impurities in the original coal. Class F fly ash contains more than 70% of silica, alumina and ferric oxide and typically less than 8% of calcium oxide.

Table 1 presents the typical chemical composition, obtained by X-Ray Fluorescence, of class F fly ash (FAF) used in the scope of this invention. Table 1 shows that the fly ash composition matches the requirements of a type F fly ash, with a CaO content of less than 8%. The chemical composition presented in table 1 only represents an example and the present invention is not limited to the chemical composition of table 1.

Table 2 also presents some other typical but not limiting properties of the ground BFS used in the frame of the invention.

Class F fly ash is mainly a finely dispersed material, with a specific surface of 250 to 350 square meter per kg. In order to limit the energy consumption and reduce the manufacturing price of the binder, the fly ash type F does not require any pre-milling process.

Figure 1:
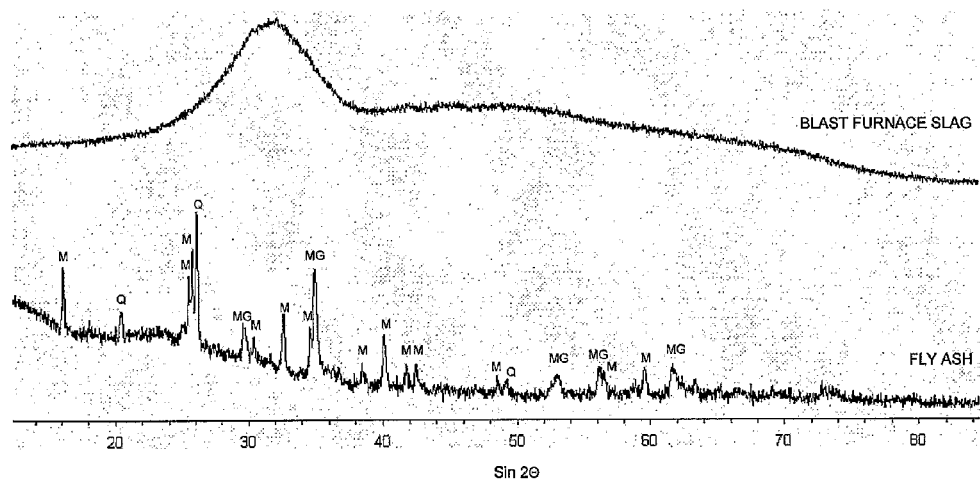
FIG. 1 shows the mineralogical composition obtained by X-Ray diffraction of the Class F Fly ash and Blast Furnace Slag used to make the binder composition according to the present invention.
Figure 2A:
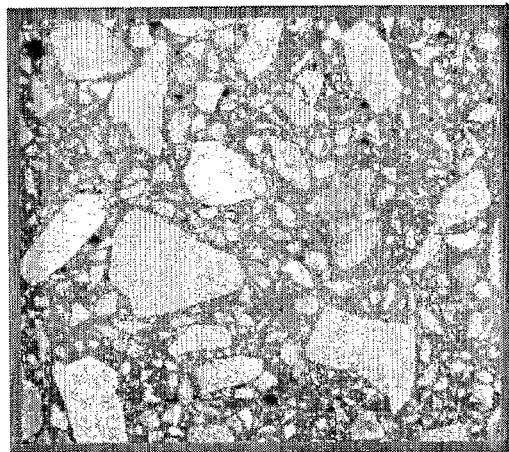
FIG. 2a shows a typical cylindrical concrete sample prepared with a binder according to the present invention.
Figure 2B:
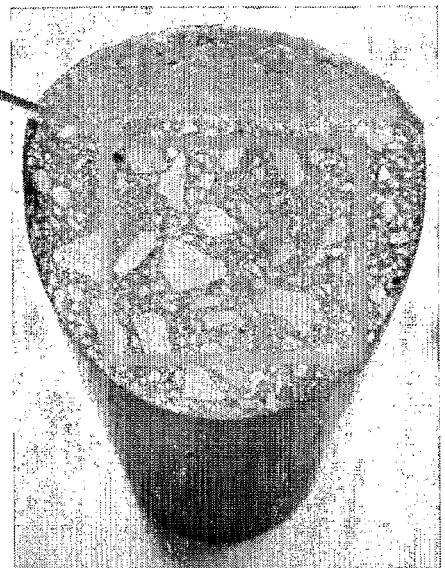
FIG. 2b shows additional details of the microstructure obtained.

FIG. 1 presents a typical X-Ray Diffraction pattern performed on a FAF. It can be observed that the product is partially crystalline. The principal mineral phases found in the FAF are described with the following nomenclature: M-Mullite (alumino-silicates) Q-Quartz and MG-Maghemite (iron oxide). On FIG. 1 it can also be observed the fact that the bulk material FAF also contains one or more amorphous (glassy) phases, which represents 50-60% by weight. The glassy phases, characterized by the halo presented in the background of FIG. 1 ($\cong$19-32 sin 2$\Theta$), are mainly constituted of aluminosilicates.

The second component of the binder is blast furnace flag (BFS). BFS is a highly impure calcium alumina-silicate glass that is a by-product from the pig iron production. BFS is typically used in the cement industry as a pozzolanic material in addition to Portland clinker and in the concrete industry as an addition to the cement portion.

Table 1 presents the typical chemical composition of the BFS used in the scope of this invention. The chemical composition is classically obtained by X-Ray Fluorescence. The chemical composition presented in table 1 only consists in an example and the present invention is not limited to the chemical composition of table 1. Table 2 also presents some other typical but not limiting properties of the ground BFS used in the frame of the invention.

FIG. 1 shows a typical X-Ray Diffraction pattern performed on a BFS. It can be observed that the product is mainly amorphous. The amorphous content of the BFS is typically higher than 90% in weight. Table 2 also presents some other typical but not limiting properties of the ground BFS used in the frame of the invention.

The BFS comes in the form of a granulated medium with a very low specific surface The size of the individual particles varies from some millimeters to some centimeters. Therefore, the BFS has to be ground using a conventional industrial mill (bar mill, ball mill) in order to obtain a specific surface from 350 to 600 square meters per kilogram. This operation is very conventional in the cement and concrete industry.

Thus, unlike some other binders of the prior art, the binder according to the present invention does not require special grinding or milling operation to increase the specific surface to very high values (over 650 square meters per Kg).

It has to be stated here that the milling energy varies exponentially with the fineness. Thus, requirements for high specific surface yield enormous production costs in energy and in milling capacity of the industrial mills since the duration of the milling has to be drastic to reach elevated fineness.

The present invention does not require specific BFS grinding operations and complies with the values that are conventional for cement industry (350 to 600 square meters per Kg). As a consequence, the invention makes it possible to use ground BFS from a normal milling terminal, yielding no additional costs.

The third category of components with regard to the invention is the chemical activator.

Unlike other binders of the prior art, the chemical activator only contains alkaline silicates and alkaline carbonates. In order to meet the objective of cost reduction, Sodium will be the preferred selected alkali according to a first embodiment, but it is clear that lithium and/or potassium can advantageously replace or partially substitutes the sodium for some applications.

The sodium carbonate, also called soda ash and the sodium silicate are commercially available in large industrial quantities and exist in solid form (powders) and in liquid form.

The fourth component according to the binder is water. The water used for the invention does not require any particular precaution and it can be considered that any water that would be used advantageously for an Ordinary Portland Cement (OPC) can be use without restriction with the binder according to the present invention.

Here, it can be seen that the number of components used in the formulation of the binder according to the invention is very limited and industrially available at low costs. Furthermore, none of the components require any specific pre-treatment and can be used from the conventional manufacturing processes without yielding additional costs.

Another important advantage of the invention with respect to the components is that they do not require specific transportation, storage and hazardous precaution. As a consequence, they can be mixed together at any place, or pre-mixed and transported, making it possible the use of the binder on the field as an Ordinary Portland Cement. This is not the case for most of the binders that require complex formulation, and require high ph values due to addition or toxic and corrosive basis like concentrated sodium hydroxide.

In order to provide a binder that would have the same flexibility and the wide range of applications of an Ordinary Portland Cement (OPC), it is important not only to focus the attention on the strength that will develop after 28 days but also to consider the strength at the early stage. The resistance after 2 days is in that respect an important value for many applications (pre-cast, slabs, building construction, etc.). Typically, an EN standard mortar (sand to binder ration of 3) based on an Ordinary Portland Cement, would yield resistance strength in compression to values from 10-30 MPa after 48 hours at room temperature.

It is one goal of the invention to achieve similar early strength without having to use special curing conditions at elevated temperature (vapor curing, etc.) in order to respect the polyvalence, the flexibility and the low cost of the binder. Unlike other binders described in the prior art, the binder according to the invention does not require any special curing to enable acceptable strength development after 48 hours. It will be shown that the compressive resistance obtained after 2 days using standard curing conditions is identical to the compressive resistance of an Ordinary Portland Cement in the same conditions.

The components of the novel cementitious invention have the following role:

Blast Furnace Slag is the hardener. It reacts by itself when the pH is high enough (pH>12) and the strength may be improved when there are an appropriate alkalis content in the system. Its main role in the invented binder is to involve and encapsulate by its hardening the whole content of class F Fly Ash F volume.

Class F Fly Ash is the active filler. Its superficial amorphous content can be attacked when the pH is high enough (pH>12) and the dissolved products can provided strength when there are an appropriate alkalis content in the system and during the strength development of Blast furnace slag.

Alkaline carbonates and silicic salts type, $R_2O\ (n)SiO_2$, called alkaline silicate, where R is an alkaline ion from Na, K or Li are the activators. The main role of these products are: a) to increase the pH of the solution and b) to provide enough alkalis and soluble silicates to react with the blast furnace slag and F type fly ash for the strength development during the curing process of the hydrated binder. It is desirable to remark that the alkaline activation that takes place in the present invention can be carried out using non-corrosive activators (pH below 13).

Advantageously, the silica to alkali molar ratio of the activator is located between 0.1 and 0.4. Although alkali silicates present the advantage to provide a very concentrated alkali source, the selection of the alkali carbonates as activator is motivated by economical reasons since carbonates are cheap, widely available in the form of powdered material. Finally, carbonates have the advantage to avoid high PH development, which is a very important advantage with regard to safety issues.

The mechanism of the novel cementitious binder may be explained as follows:

When the dry cementitious binder is mixed with water, the pH and the alkalis content increases in the pore mixture.

This fact gives rise to the following steps: a) superficial hydration of blast furnace slag, b) superficial attack of class F Fly Ash by dissolution of amorphous silicates and aluminates, c) saturation of ions in the pore solution mixture and progressive precipitation of amorphous products on the BFS and class F fly ash particles surface with the consequent setting of the hydrated mix. On the BFS particles, hydrated calcium silicates enriched in aluminium and alkalis are formed whereas on the class F fly ash particles, hydrated alkalosilicoaluminates enriched in calcium are formed.

The presence of soluble silica and alkalis make shorter the hydration and formation of the cementitious gel which comes from the BFS than without their presence. This gel encapsulates the class F fly ash and reacts with the initial superficial alkalosilicoaluminate products to form an interphase between BFS and F type fly ash particles. During the binder maturation, a diffusion of the alkalis and OH ions is carried out through the inner areas of BFS and F type FA particles. At the same time, the mentioned diffusion also occurs in through the interphase BFS-FA reaction products, being enriched in alkalis and as a consequence being improving the link between the hardener and the active filler. This fact gives rise to an improvement of the mechanical and durability properties of the hydrated binder.

The strength development of the novel cementitious binder, at room temperature, depends on the water/binder ratio, pH, concentration of activators and amorphous content.

It is important to observe that, in a particular embodiment of the invention; the chemical activator is primary dissolved in water to form an activator solution, which is then mixed with BFS and FAF.

Of course, the invention is not limited to the described components. One can for instance consider alternatives involving for instance the addition of the components by industrial and agricultural residues containing high alkalis or highly reactive amorphous silica. For example, silica fume, rice husk ashes or natural aluminosilicates like volcanic pozzolanes or zeolites can also be added to the binder. We will now describe some applications and mixes. The various components are mixed together in order to obtain a powder mixture that can be used and distributed in bags or in bulk and used as an Ordinary Portland Cement. The various components are mixed together using conventional dry bulk mixer or rotating homogenizers. This very simple industrial equipment is available on the market or can be manufactured with no difficulty since it does not require advanced engineering skills. Thus, the mixtures can then be used as a normal Ordinary Portland Cement.

TAB. 3 shows a typical example of the strength development of mortars prepared with the binder composition according to the invention at 2, 7, and 28 days using compressive test.

The mortars were prepared with a binder according to the invention and using standard sand according to EN 196, with a sand binder ration of 3. Preparation, curing and testing were performed at room temperature in normalized conditions. In these examples, Blast Furnace Slag (8-28% by weight) and Class F Fly ash (60-85% by weight) were used as a hardener and active filler respectively. Industrially available alkaline carbonate ($R_2CO_3$) and alkaline silicates ($R_2O\ (n)SiO_2$) were used as activators, being R either Na or K.

The strength development is in accordance to the expectation and mortars present a very good early strength at 2 days and an improved very high resistance at 28 days with respect to Ordinary Portland Cement.

According to a second aspect of the invention, we will now describe an optimized method to use the binder according to the invention for concrete, ready mix and pre-cast applications.

The following process enables to further decrease the overall cost of the binder by using the most appropriate methods to incorporate the different components of the binder and the aggregates to constitute a concrete or mortar.

According to a first embodiment of the invention, the method comprising the following step:
    preparation of an activator solution by dissolution of the chemical activator in water; (step 1) and
    Mixing the activator solution with sand and/or aggregate, class F fly ash and blast furnace slag.

Thus, large quantities of activator solution can be prepared in advance. Furthermore, the method is safer because heat release will occur only during this activator solution preparation step and will not occur during further step.

According to a preferred embodiment of the invention, mixing the activator solution with sand and/or aggregate, class F fly ash and blast furnace slag comprising the following steps:
 a) In a first mixer, preparing an initial mix by homogenisation of sand and/or aggregate, class F fly ash and a small quantity of water (step 2);
 b) In a second mixer, preparing the hardening slurry mixture by homogenisation of the activator solution and the blast furnace slag (step 3);
 c) Mixing the initial mix with the hardening mixture slurry (step 4).

Thus, the final mixture can be achieved efficiently since the hardening mixture obtained by step 3 is very fluid.

According to this method, the overall mixing duration of steps 2 to 4 does not exceed the mixing duration of a normal process.

In a preferred way, all the required water is provided during the step 1 and 3 with no addition of water during the step 4. Thus, 100% of the chemical activator dissolution is achieved during the step 1 since during this step, water is available.

Furthermore, no heat release related to the dissolution of the activators in water will occur while mixing all the components (step 4). Furthermore, the final mixture is achieved more efficiently since the slurry obtained at step 4 is very fluid.

Finally, a wide range of organic and inorganic admixtures can be added to the formulation if necessary (in a similar way to standard concrete based on OPC) to modify the properties of the concrete (air entrainer, superplastizers, retarders, accelerators, etc.).

The invention claimed is:

1. A hydraulic cementitious binder manufactured from fly ash, blast furnace slag and a chemical activator comprising:
 from 60 to 85 wt. % of fly ash containing less than wt. 8% of CaO;
 from 8 to 28 wt. % of blast furnace slag; and
 a chemical activator containing:
  from 1 to 4 wt. % of alkaline silicates; and
  from 7 to 11 wt. % of alkaline carbonates.

2. A cementitious binder according to claim 1, wherein the fly ash is pure class F fly ash.

3. A cementitious binder according to claim 1, wherein the fly ash has a specific surface from 200 to 500 square meters per Kg.

4. A cementitious binder according to claim 1, wherein the blast furnace slag has a specific surface from 350 to 600 square meters per Kg.

5. A cementitious binder according to claim 1, wherein the alkaline silicates are at least one of sodium silicates, potassium silicates, or lithium silicates; and the alkaline carbonates are at least one of sodium carbonates, potassium carbonates, or lithium carbonates.

6. A cementitious binder according to claim 1, wherein the alkaline silicates are sodium or potassium silicates; and alkaline carbonates are sodium or potassium carbonates.

7. A cementitious binder according to claim 1, wherein the chemical activator has an silica to alkali molar ratio from 0.1 to 0.4.

8. A cementitious binder according to claim 1, further comprising industrial or agricultural residues containing either high alkalis content or highly reactive amorphous silica.

9. A mortar characterized in that it comprises water and sand mixed with a binder according to claim 1.

10. A concrete characterized in that it comprises water, sand and aggregate mixed with a binder according to claim 1.

11. A method to produce mortar or concrete based on a binder with the following composition:
 from 60 to 85 wt. % of fly ash containing less than 8% w/w of CaO;
 from 8 to 28 wt. % of blast furnace slag; and
 a chemical activator containing:
  from 1 to 4 wt. % of alkaline silicates; and
  from 7 to 11 wt. % of alkaline carbonates,
 comprising the following steps:
  a) Preparing an activator solution by dissolution of the chemical activator in water;
  b) Mixing the activator solution with sand and/or aggregate, class F fly ash and blast furnace slag.

12. A method to produce mortar or concrete according to claim 11 wherein mixing the activator solution with sand and/or aggregate, class F fly ash and blast furnace slag comprising the following steps:
 a) Preparing an initial mix by homogenisation of sand and/or aggregate, class F fly ash and water;
 b) Preparing a hardening slurry mixture by homogenisation of the activator solution and the blast furnace slag;
 c) Mixing the initial mix with the hardening mixture slurry.

13. A method according to claim 12 wherein the initial mix comprising from about 1 to about 5% by weight of water.

14. A method according to claim 11, wherein the fly ash is pure class F fly ash.

* * * * *